United States Patent
Kuriyama (10) Patent No.: US 6,641,045 B1
(45) Date of Patent: Nov. 4, 2003

(54) PORTABLE ELECTRONIC DEVICE WITH SELF-DIAGNOSTIC FUNCTION

(75) Inventor: Ryouichi Kuriyama, Yokosuka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 281 days.

(21) Appl. No.: 09/663,920

(22) Filed: Sep. 18, 2000

(30) Foreign Application Priority Data

Dec. 13, 1999 (JP) ............................................. 11-353176
Sep. 7, 2000 (JP) ...................................... 2000-271686

(51) Int. Cl.⁷ ............................................... G06K 7/10
(52) U.S. Cl. .................. 235/472.01; 235/379; 235/380; 235/441
(58) Field of Search ....................... 235/472.01, 472.02, 235/379, 375, 380, 441

(56) References Cited

U.S. PATENT DOCUMENTS

| 4,939,353 A | 7/1990 | Iijima |
| 5,581,708 A | 12/1996 | Iijima |
| 5,678,029 A * | 10/1997 | Iijima ........................... 710/65 |
| 5,682,027 A * | 10/1997 | Bertina et al. ............... 235/380 |
| 5,856,659 A * | 1/1999 | Drupsteen et al. ........... 235/375 |
| 6,220,510 B1 * | 4/2001 | Everett et al. ............... 235/379 |
| 6,275,873 B1 * | 8/2001 | Akasaka et al. ............. 235/441 |

FOREIGN PATENT DOCUMENTS

| JP | 63-234375 | 9/1988 |
| JP | 2577369 | 11/1996 |

OTHER PUBLICATIONS

Patent abstracts of Japan, vol. 013, No. 210, 1989.

* cited by examiner

Primary Examiner—Michael G. Lee
Assistant Examiner—Steven S. Paik
(74) Attorney, Agent, or Firm—Pillsbury Winthrop LLP (57) ABSTRACT

A portable data processing device is disclosed which, when connected to and activated by an external device, transmits initial response data to the external device, performs a self-diagnosis of whether the portable data processing device operates properly, and then receives a command from the external device and performs corresponding processing to the received command.

8 Claims, 11 Drawing Sheets

PORTABLE ELECTRONIC DEVICE WITH SELF-DIAGNOSTIC FUNCTION

CROSS-REFERENCE TO RELATED APPLICATIONS

This application is based upon and claims the benefit of priority from the prior Japanese Patent Application No. 11-353176, filed Dec. 13, 1999; and No. 2000-271686, filed Sep. 7, 2000, the entire contents of which are incorporated herein by reference.

BACKGROUND OF THE INVENTION

The present invention relates to a portable electronic device, such as an IC (smart) card, which has a nonvolatile memory for storing data and reads from and writes into the memory for the transfer of data to and from outside.

Recently, IC cards have begun to be used in various fields of industry which have an on-board IC chip having a nonvolatile memory and a control device such as a CPU (central processing unit).

In general, the IC cards of this type are arranged to make data transfers to and from an external device (IC card reader/writer) using commands and responses.

Such IC cards do not usually have a self-diagnostic function built in, which performs a self-diagnosis of whether they work properly. In recent years, however, IC cards having a built-in self-diagnostic function have been developed.

An IC card with a built-in self-diagnostic function that is disclosed in U.S. Pat. No. 4,939,353 is arranged to perform all diagnoses prior to the start of transfer of initial response data to an external device after the card was activated.

However, since the interval between the moment that the card is activated (resetting cancellation) and the moment that the initial response data is outputted is set by standards to 400 to 40,000 clock periods, errors might occur if the interval were in excess of the settings. Thus, only limited diagnoses are allowed within this short interval, failing to perform sufficient self-diagnosis.

Further, Jpn. Pat. Appln. KOKAI publication No. 63-234375 might suggest performing a diagnosis after the first cycle of initial response data (after 1 byte output) before next cycle of initial response data (next 1 byte output). However, this would impose restrictions on the signal format of the initial response data, requiring a long time to transfer the initial response data. In that event, the external device would thus judge that a time-out error had occurred in the initial response data.

When the IC card fails to perform the self-diagnosis, for example, when an LSI within the IC card has been damaged by an external shock, malfunctions may occur upon entry of commands from the external device, resulting in loss of the reliability of the IC card.

BRIEF SUMMARY OF THE INVENTION

It is an object of the present invention a portable electronic device which permits a self-diagnosis to be performed even if a command is received at any time after initial response data has been output, the self-diagnosis to be performed during an idle time (command waiting time) within processing time, and the total processing time from the beginning to the end of session to be utilized in an efficient manner, and malfunctions to be prevented.

According to the present invention, there is provided a portable data processing device comprising: initial response transmit means for, in response to the portable data processing device being connected to and activated by an external device, transmitting initial response data to the external device; self-diagnosis means for performing a self-diagnosis of whether the portable data processing device operates properly after the initial response transmit means has transmitted the initial response data to the external device; and command processing means for receiving a command from the external device and performing corresponding processing to the received command after the self-diagnosis has been performed by the self-diagnosis means.

The portable electronic device of the present invention, when connected to and activated by the external device, transmits all the initial response data to the external device. After that, a self-diagnosis is performed to ensure that the portable electronic device operates properly. Unlike the prior art in which self-diagnosis is performed within a short interval when initial response data is transmitted, in the present invention, since no restriction is imposed on the self-diagnosis processing time, a sufficient time can be taken for self-diagnosis of many items. Since there is no need to perform the self-diagnosis at the same time the initial response data is transmitted, no restriction is imposed on the signal format of the initial response data, which prevents the occurrence of communication errors due to failure to take the optimum signal format. Therefore, a portable data processing device can be provided which permits compatibility of communication with the external device and self-diagnosis.

In addition, in the present invention, an embodiment is disclosed which, upon receipt of a command from the external device during self-diagnosis, suspends the self-diagnosis and then resumes it after the reception of the command. This embodiment will also provide a portable data processing device which permits compatibility of communication with the external device and self-diagnosis with high reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
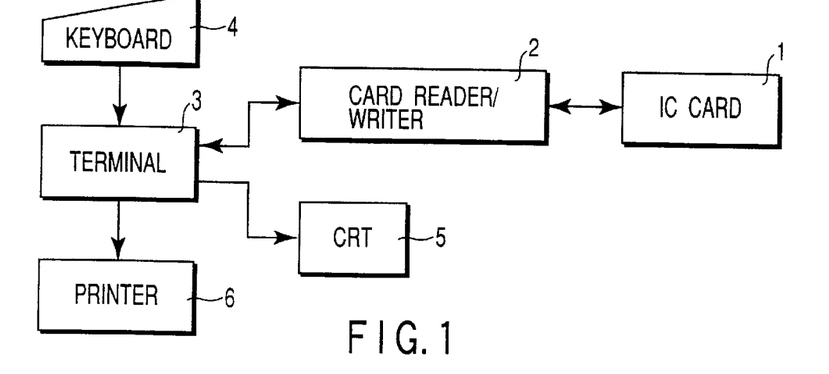
FIG. 1 is a schematic block diagram of a system that handles an IC card embodying the present invention.

Referring now to FIG. 1, there is illustrated in block diagram form a system that handles an IC card as a portable electronic device of the present invention. The system is arranged to permit an IC card 1 to be coupled through a card reader/writer (external device) 2 with a terminal unit 3 to which a key board 4, a display such as a CRT display unit 5 and a printer 6 are attached.

Figure 2:
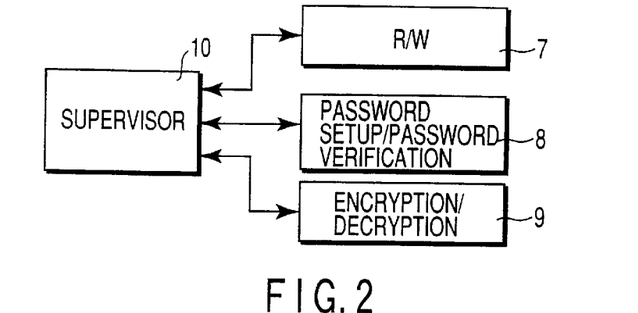
FIG. 2 is a functional block diagram of the IC card.

The IC card 1, as shown in its functional block diagram of FIG. 2, comprises a read/write section 7, a password setup/password verification section 8, and an encryption/decryption section 9, which carry out basic functions, and a supervisor 10 for managing these functions.

The read/write section 7 performs functions of reading from, writing into, and erasing a data memory.

The password setup/password verification section 8 performs functions of storing a password (identification number) set up (established) by a user, causing the password to be read inhibited, checking an input password with the original user's password to determine its validity, and giving the user permission for subsequent processing.

The encryption/decryption section 9 performs functions of encrypting communications data to be transmitted from the terminal unit 3 to another terminal unit over a communications line and decrypting encrypted data from outside in order to achieve data security.

The supervisor 10 performs functions of decoding codes with or without data from the card reader/writer 2 and executing them.

Figure 3:
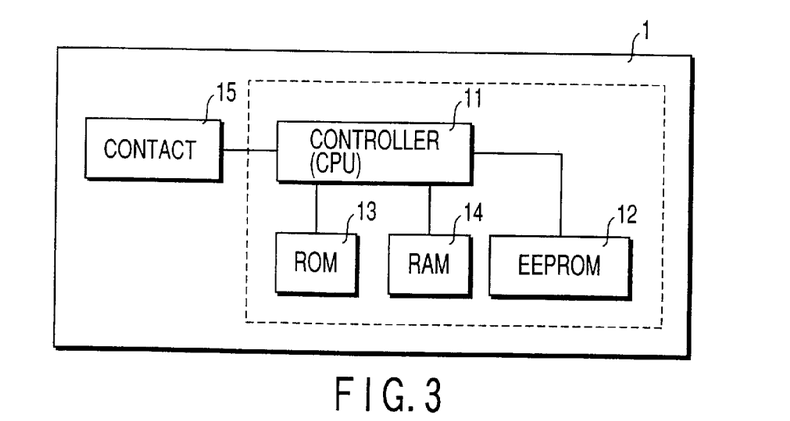
FIG. 3 is a schematic block diagram of the IC card.

To fulfill these functions, the IC card 1 comprises a controller (control section) 11 such as a CPU, a data memory 12, a program memory 13, a work memory 14, and a contact section 15 that allows the card to be brought into electrical contact with the card reader/writer 2. The controller 11, the data memory 12, the program memory 13 and the work memory 14 are formed of a single IC chip (or multiple IC chips) and embedded in the card.

The program memory 13 having a mask ROM stores a control program for the controller 11 that contains subroutines for implementing the aforementioned functions.

The data memory 12 having for example, a nonvolatile memory such as an EEPROM, is used to store data.

The work memory 14 having a volatile memory such as a RAM, is used for current work.

Figure 4:
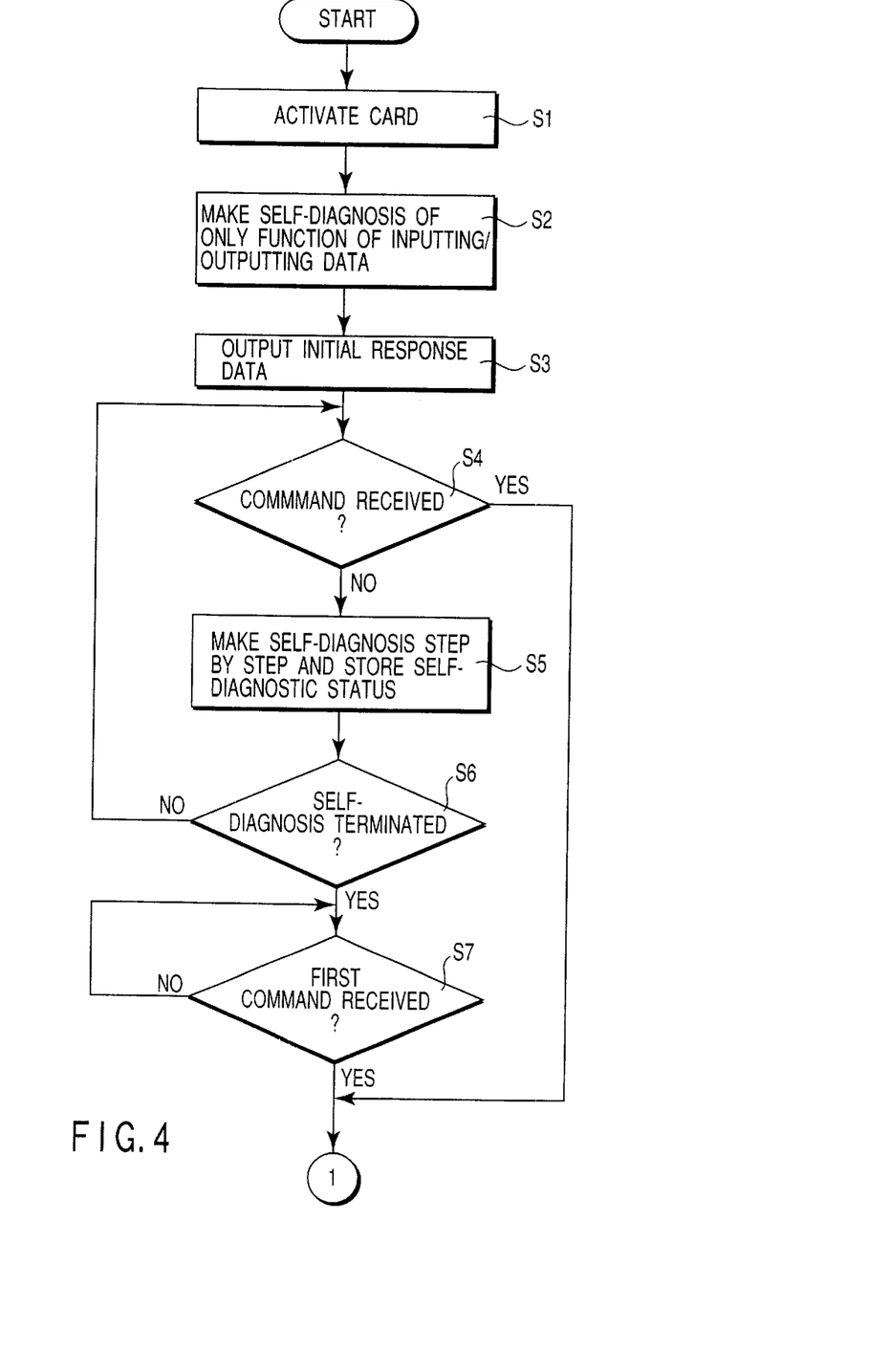
FIGS. 4 and 5 form a flowchart illustrating the operation of the IC card.
Figure 5:
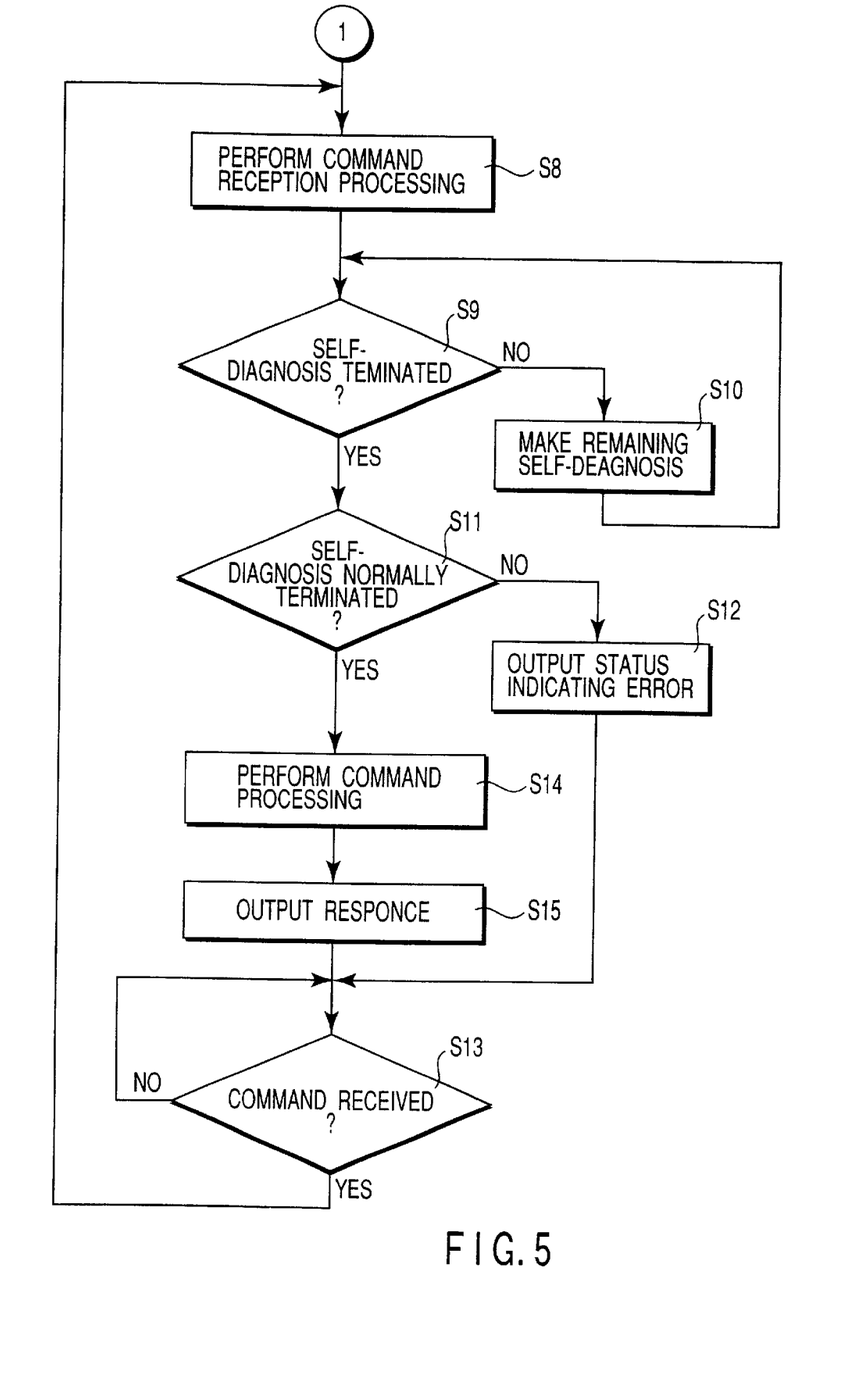

The operation of the IC card 1 will be described below with reference to a flowchart shown in FIGS. 4 and 5 and timing diagrams shown in FIGS. 6 through 9. In this operation, a self-diagnosis is divided into two parts. The first self-diagnosis is performed prior to the initial response output I at least to confirm the operation for transmitting and receiving data. The second self-diagnosis is performed after the transmission of initial response data I.

In this case, the initial response output I is the answer-to-Rest regulated by ISO/IEC 7816-3. Therefore, the output of the initial response data is to output a plurality of character having a plurality of bit (for example 1 byte).

Figure 6:
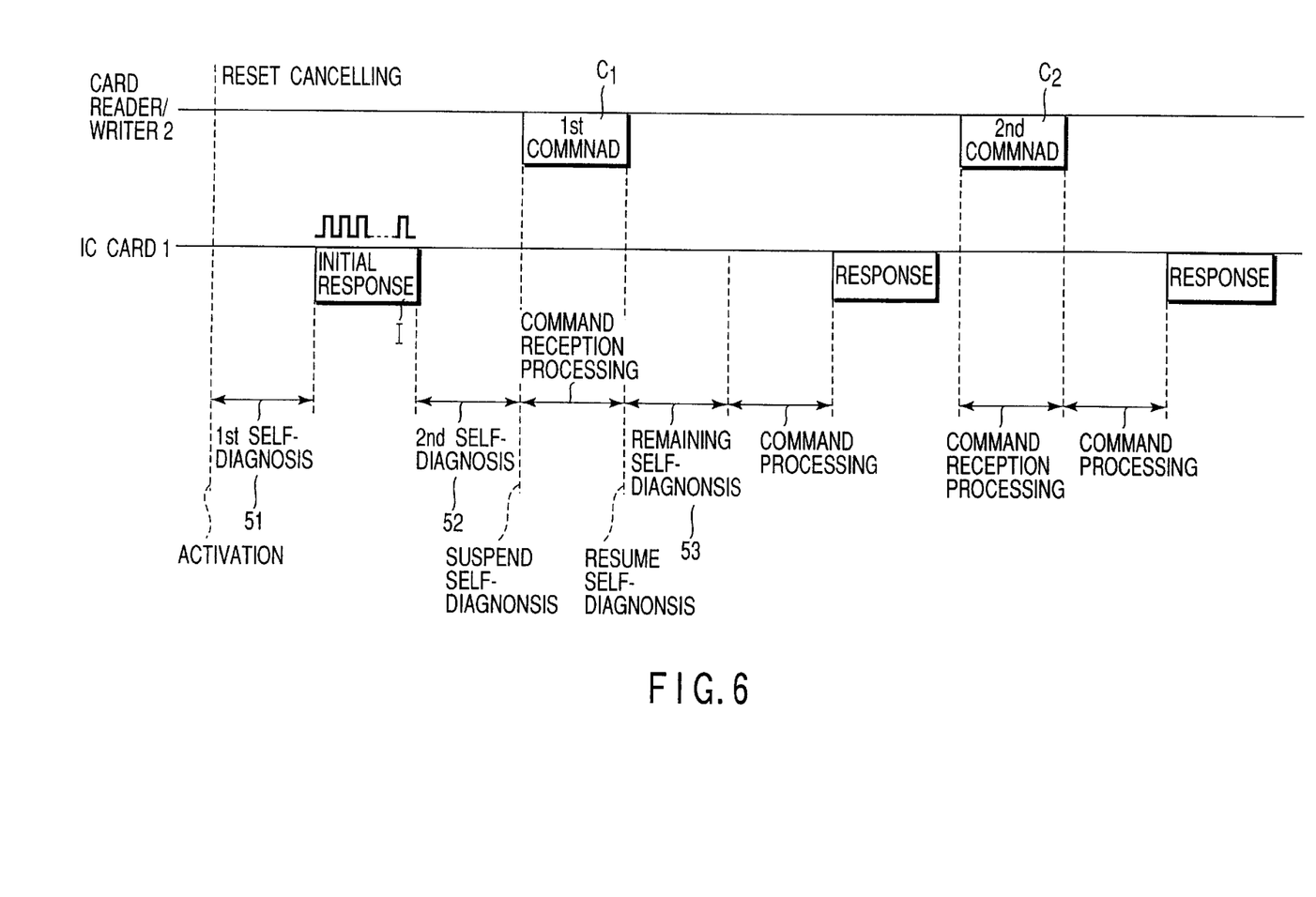
FIG. 6 is a timing diagram for use in explanation of the operation of the IC card.
Figure 7:
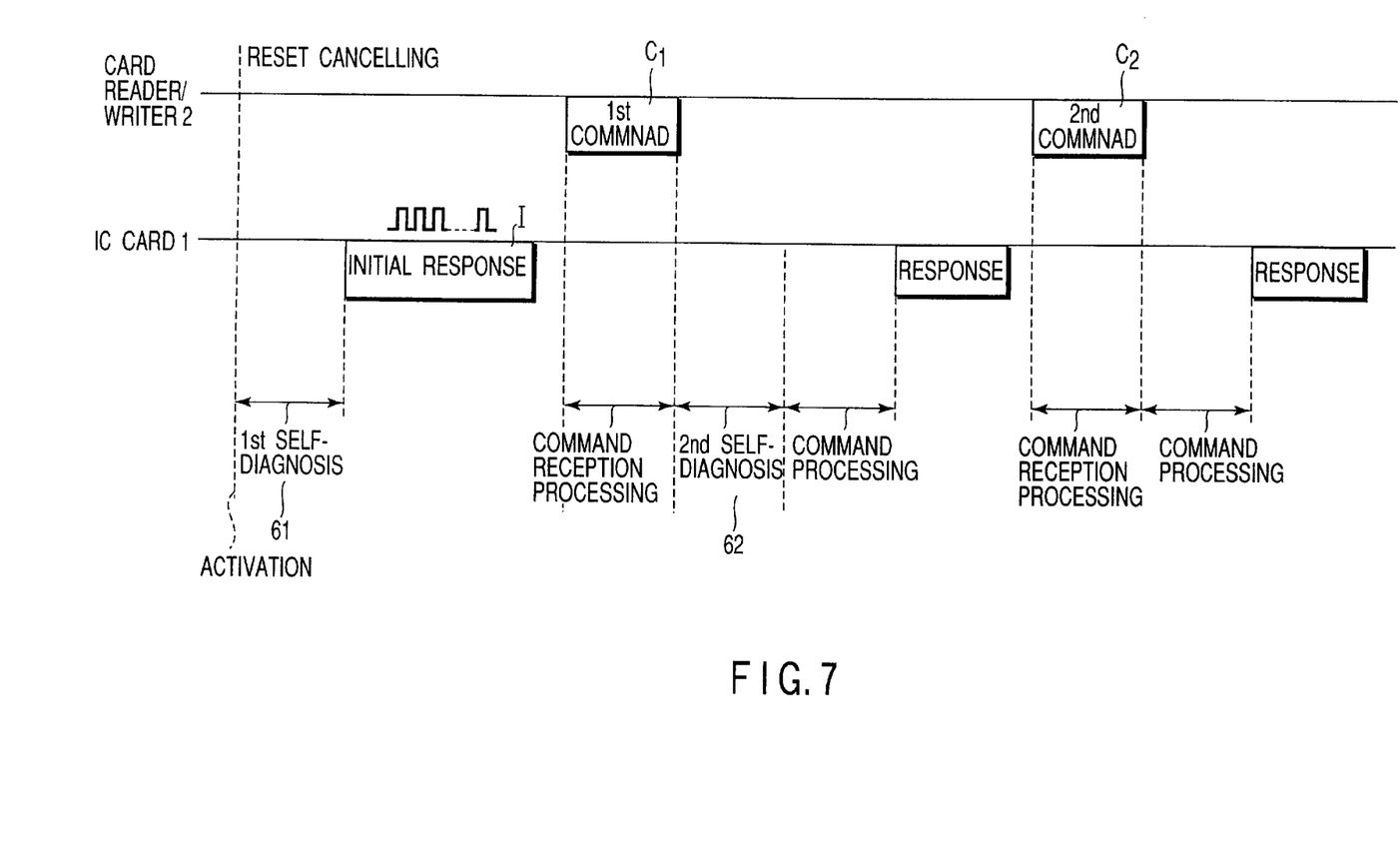
FIG. 7 is a timing diagram for use in explanation of the operation of the IC card.
Figure 8:
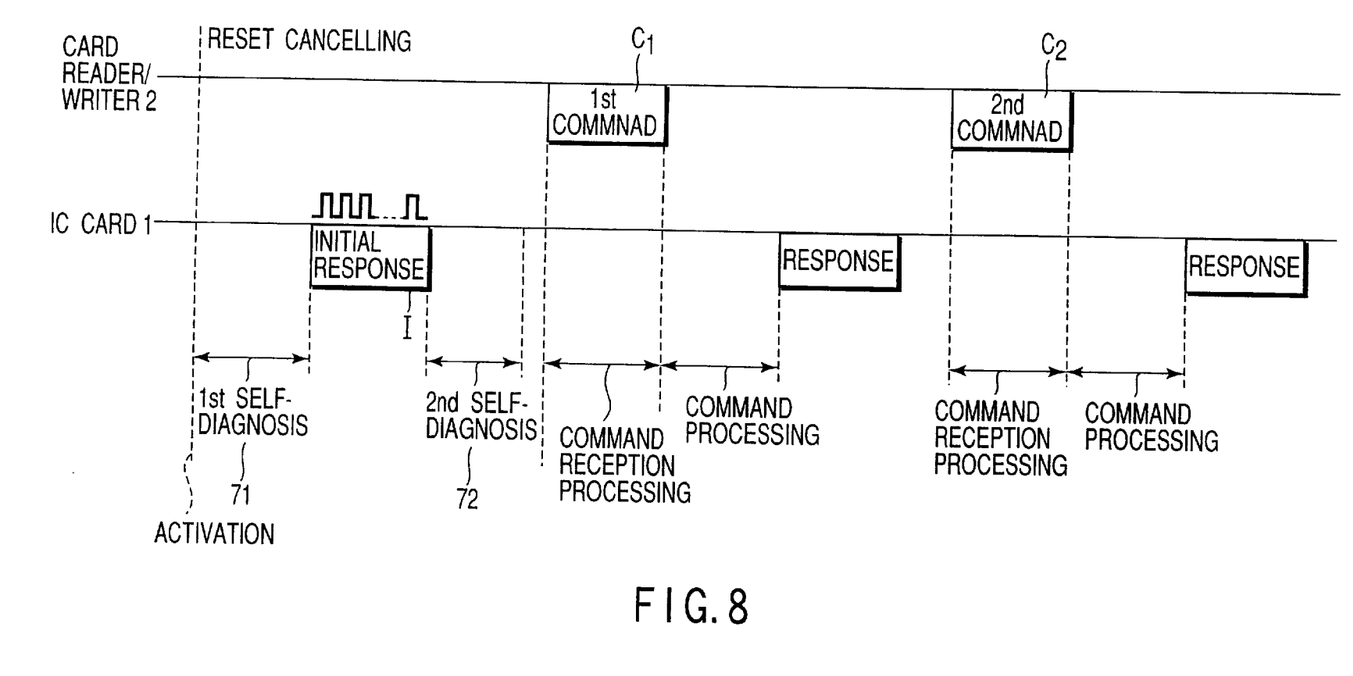
FIG. 8 is a timing diagram for use in explanation of the operation of the IC card.
Figure 9:
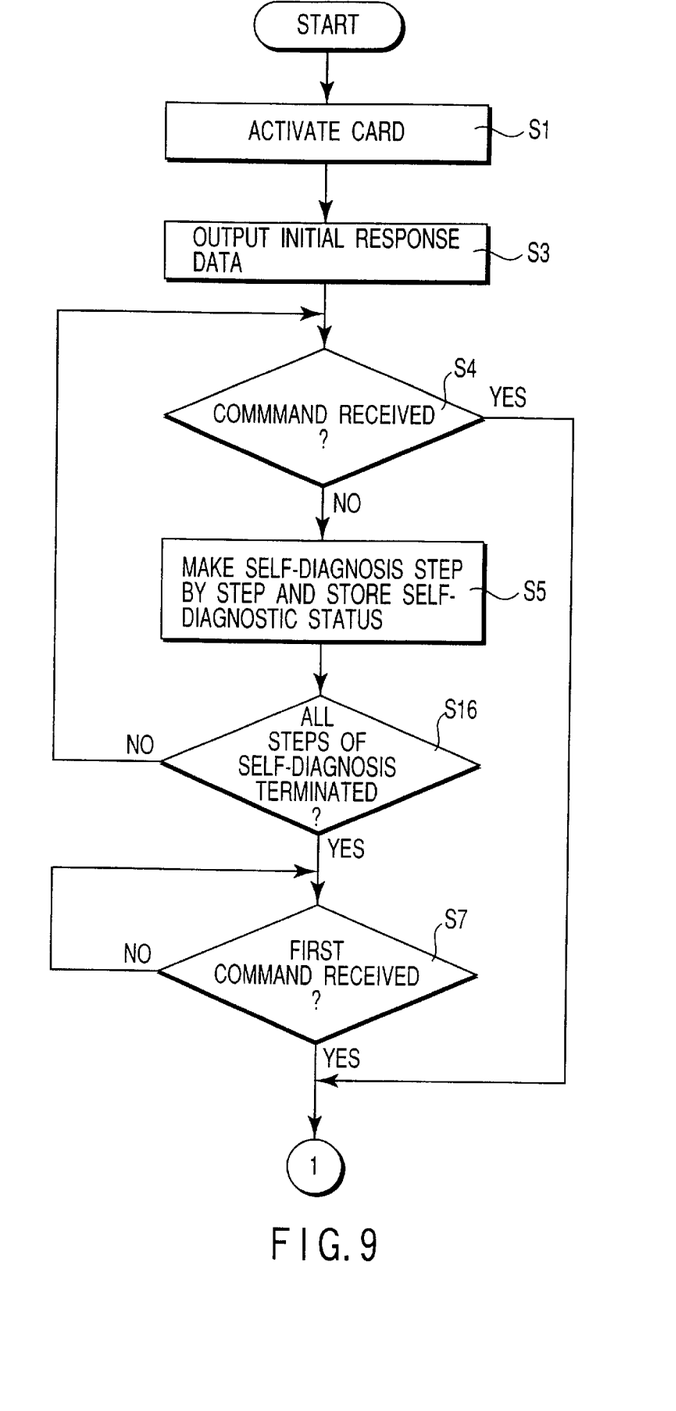
FIGS. 9 and 10 are flowcharts illustrating the second operation of the IC card.

FIG. 6 shows a timing diagram for the case where a self-diagnosis is performed after the transmission of initial response data I and a first command C1 is entered during the self-diagnosis. FIG. 7 shows a timing diagram for the case where a self-diagnosis is performed after the transfer of initial response data I, but a first command C1 is entered prior to the commencement of the self-diagnosis. FIG. 8 shows a timing diagram for the case where a self-diagnosis is performed after the transfer of initial response data I and a first command C1 is entered after the termination of all the self-diagnosis. FIG. 9 shows a timing diagram indicating the most basic form of the present invention, in which case no self-diagnosis is performed for initial response data I and one self-diagnosis is performed after the transfer of initial response data I.

First, the IC card 1 is activated by an activating operation (resetting cancellation) (step S1). When activated, the controller 11 in the IC card tests only the function needed to input and output data to ensure that it operates properly (step S2). This self-diagnosis is referred herein to as a first self-diagnosis. The controller 11 performs this first self-diagnosis at least to confirm the operation of a buffer memory used in transmitting and receiving data. The buffer memory resides in the work memory 14.

On termination of the first self-diagnosis (51, 61, 71 in FIGS. 6, 7 and 8), the controller 11 outputs initial response data I (all of the plurality of character) to the card reader/writer 2 (step S3) and then the controller 11 makes a decision of the presence or absence of the reception of a command from the card reader/writer (step S4). If no command is received, then the controller 11 performs a self-diagnosis of the other functions than the function for which the first self-diagnosis has been performed in step S2 (step S5). This self-diagnosis is referred to as a second self-diagnosis (52, 62, 72).

The second self-diagnosis includes a step of confirming the basic operation of the controller 11, a step of confirming the operation of the data memory 12, and a step of confirming the operation of the work memory 14. The second self-diagnosis is performed for each of these steps. The results are stored into history pointers provided in the work memory 14. For example, each of the history pointers indicates one of "unexecuted (not executed yet)", "in execution", "normally terminated", and "abnormally terminated". The initial state is "unexecuted".

Then, the controller 11 checks the history pointers to make a determination of whether or not all the second self-diagnosis has been terminated (step S6). If not terminated, then the procedure returns to step S4 and the above operation is repeated.

Thus, after being activated, the IC card performs the first self-diagnostic operation only on the function needed to input and output data, outputs the initial response data I, and then performs the second self-diagnostic operation step by step while checking the presence or absence of command entry, and stores the diagnostic results into the history pointers.

If the determination in step S6 is that all the second self-diagnosis has been terminated, then the controller 11 stores the self-diagnostic results into the history pointers and waits to receive a first command C1 from the card reader/writer 2. Upon receipt of the first command C1, the controller 11 performs reception processing for that command (step S8).

Thus, when all the second self-diagnosis is terminated prior to entry of the first command C1, the self-diagnostic results are stored into the history pointers and, when the first command is entered, input processing (reception processing) for the first command is performed. This corresponds to the case of FIG. 8.

After return has been made to step S4, when the first command C1 is received in step S4, the controller 11 suspends the second self-diagnosis at that time and then proceeds to step S8 to perform only the reception processing for the command.

Thus, when the first command C1 is input while the second self-diagnosis is being performed, the diagnosis is suspended at that time and only the input processing for the first command is performed. This corresponds to the case of FIG. 6.

If the first command C1 is received in step S4 immediately after the initial response data I has been output in step S3, then the controller 11 proceeds to step S8 to perform only the reception processing for that command.

Thus, if the first command C1 is entered prior to the commencement of the second self-diagnosis, only the reception processing for that command is performed. This corresponds to the case of FIG. 7. In other words, in the case of FIG. 7, the second self-diagnosis is performed after the first command C1 has been received.

On termination of the reception processing for the first command C1 in step S8, the controller 11 checks the history pointers to make a determination of whether or not all the steps in the second self-diagnosis have been terminated (step S9). If not terminated, then the remaining steps in the second self-diagnosis are performed with their diagnostic results being stored into the history pointers (step S10). That is, in the case of FIG. 6, since the second self-diagnosis is suspended, when the reception processing for the first command C1 is terminated, the second self-diagnosis is resumed to perform its remaining steps in succession. In the case of FIG. 7, since the second self-diagnosis has not been performed yet, when the reception processing for the first command is terminated, the second self-diagnosis is performed.

If the determination in step S9 is that all the second self-diagnosis has been performed, then the controller 11 checks the history pointers to make a determination of whether or not all steps (52, 62, 72) have been terminated normally. If not terminated normally, the controller issues a status indicating a diagnostic error to the card reader/writer 2 (step S12) and then waits to receive the next command (step S13). Upon receipt of the command, the controller goes to step S8 and repeats the above operation.

If the determination in step S11 is that all the second self-diagnosis has been terminated normally, then the controller 11 executes processing for the received command (step S14). On termination of the command processing, the controller outputs a response for the command processing to the card reader/writer (step S15) and then goes to step S13 to wait to receive the next command.

Subsequent to the reception of the second command C2, the history pointers are first referenced to make a determination of whether an error has been made or whether to execute the command processing.

Figure 10:
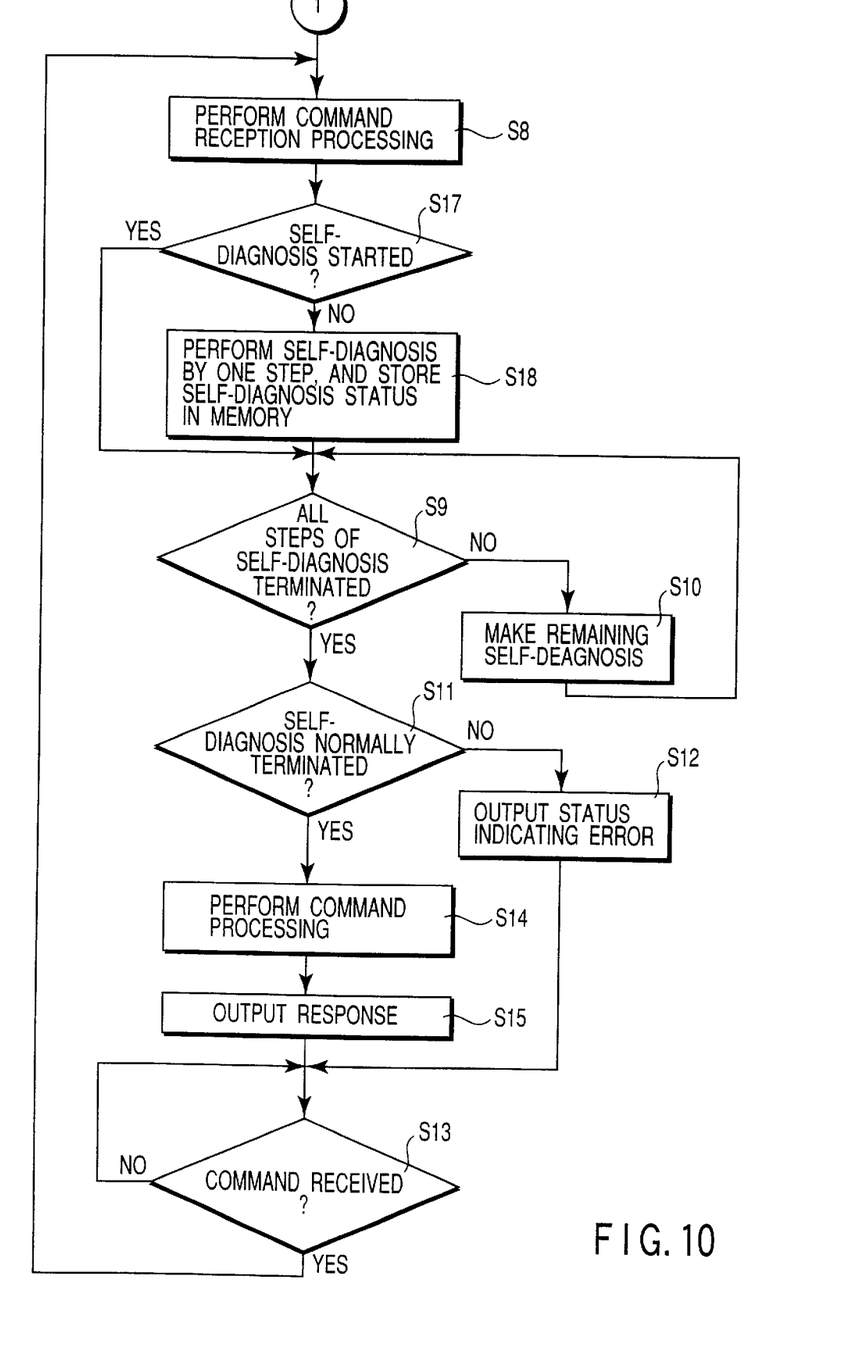

The second operation of the IC card 1 will be described below with reference to flowcharts and timing diagrams of FIGS. 11, 12 and 13. In the second operation, IC card 1 outputs then initial response I without a self-diagnosis, the IC card 1 performs the self-diagnosis after the initial response output I. In the flowchart of FIGS. 9 and 10, explanations of operations being identical to that of FIGS. 4 and 5 are omitted. In the flowchart of FIGS. 9 and 10, the self-diagnosis step (S2) prior to the initial response output I shown in FIGS. 4 and 5. Thus, after the self-diagnosis status has been stored (stepS5), a decision is made in step S16 as to whether self-diagnosis has been performed for all the steps. The all steps are a step of the confirmation of function for the buffer memory and the like necessary for the data transfer, a step of the confirmation for the fundamental operation of the control device, a step of the operation confirmation of the data memory, a step of the operation confirmation for the work memory, and so on. When a command is received, command receiving process is performed (step S8). After that, a decision is made as to whether the self-diagnosis has been started. If not started, then the self-diagnosis is performed for each step and the self-diagnosis status is stored in the storage area (step S18). The subsequent operation remains unchanged from that in the flowchart of FIGS. 4 and 5.

Figure 11:
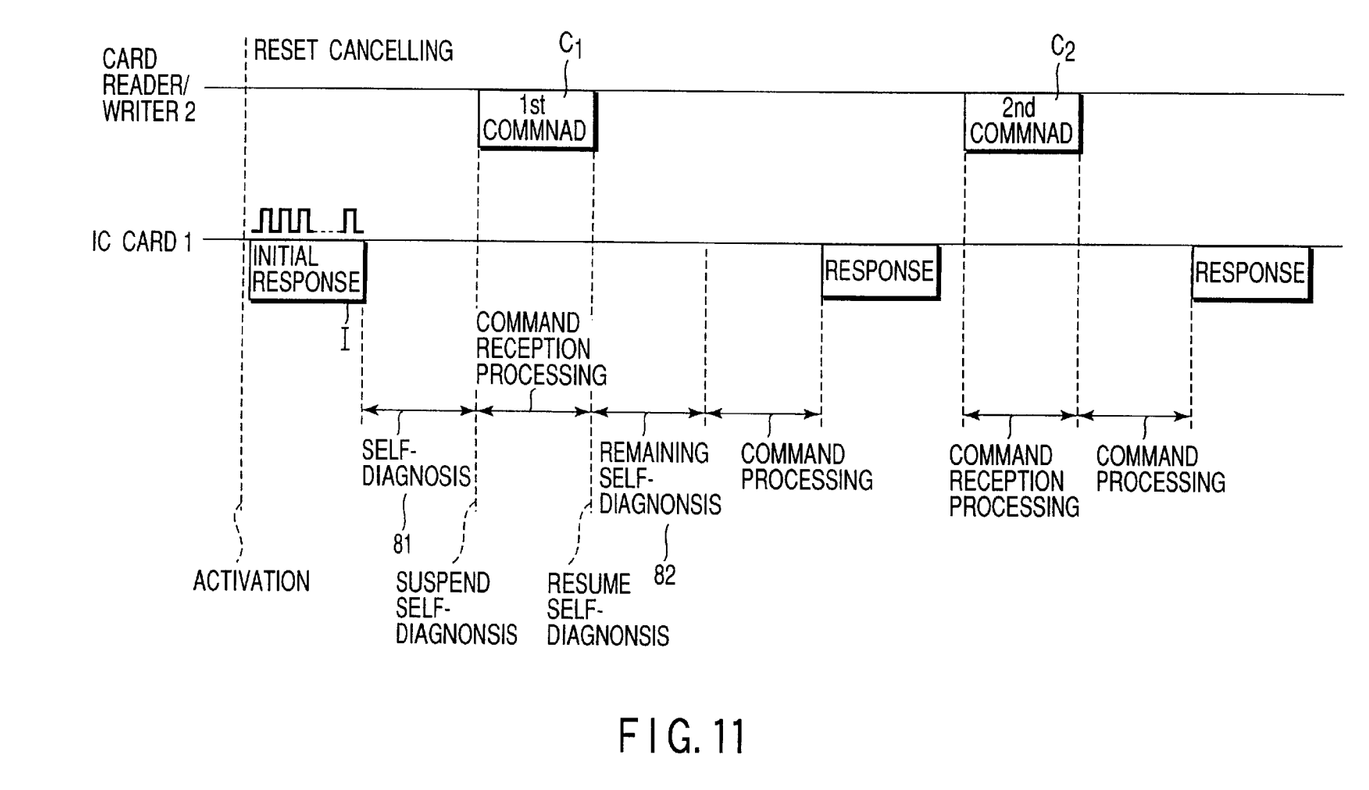
FIG. 11 is a timing diagram for use in explanation of the second operation of the IC card.

FIG. 11 is a timing diagram in the case where the initial response output is performed without self-diagnosis. In this exemplary operation, self-diagnosis (81) is performed and suspended because command is transmitted in the middle of the self-diagnosis, and the remaining self-diagnosis (82) is performed after the command receiving process has been performed. This operation indicates an example of the operation illustrated in the flowchart of FIGS. 9 and 10.

Figure 12:
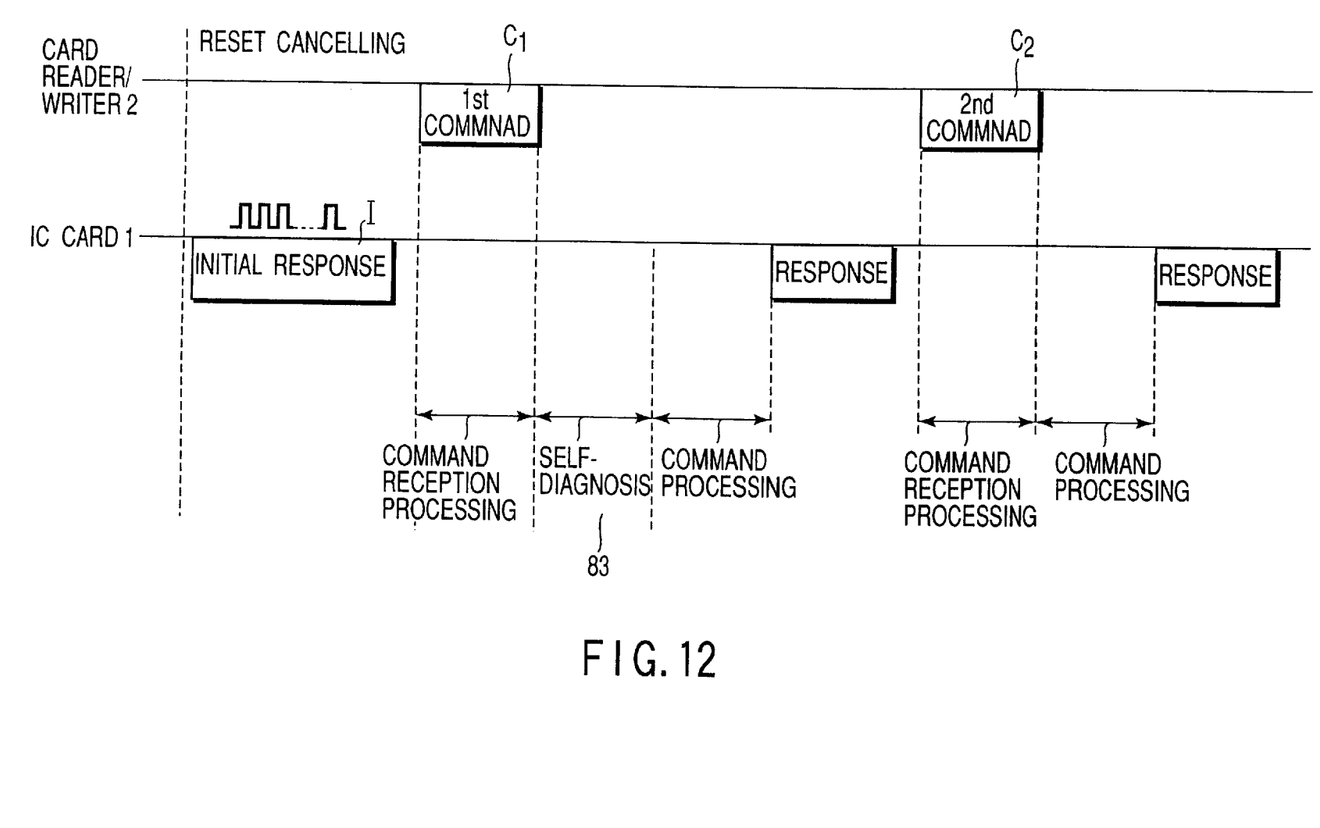
FIG. 12 is a timing diagram for use in explanation of the second operation of the IC card.

FIG. 12 is a timing diagram in the case where the initial response output is performed without self-diagnosis. In this operation, a command C1 is received after the initial response output I, the command receiving process is performed and the self-diagnosis (83) is performed to completion. After the self-diagnosis, the remaining command processing is performed and, when a second command C2 is performed, command processing is performed.

Figure 13:
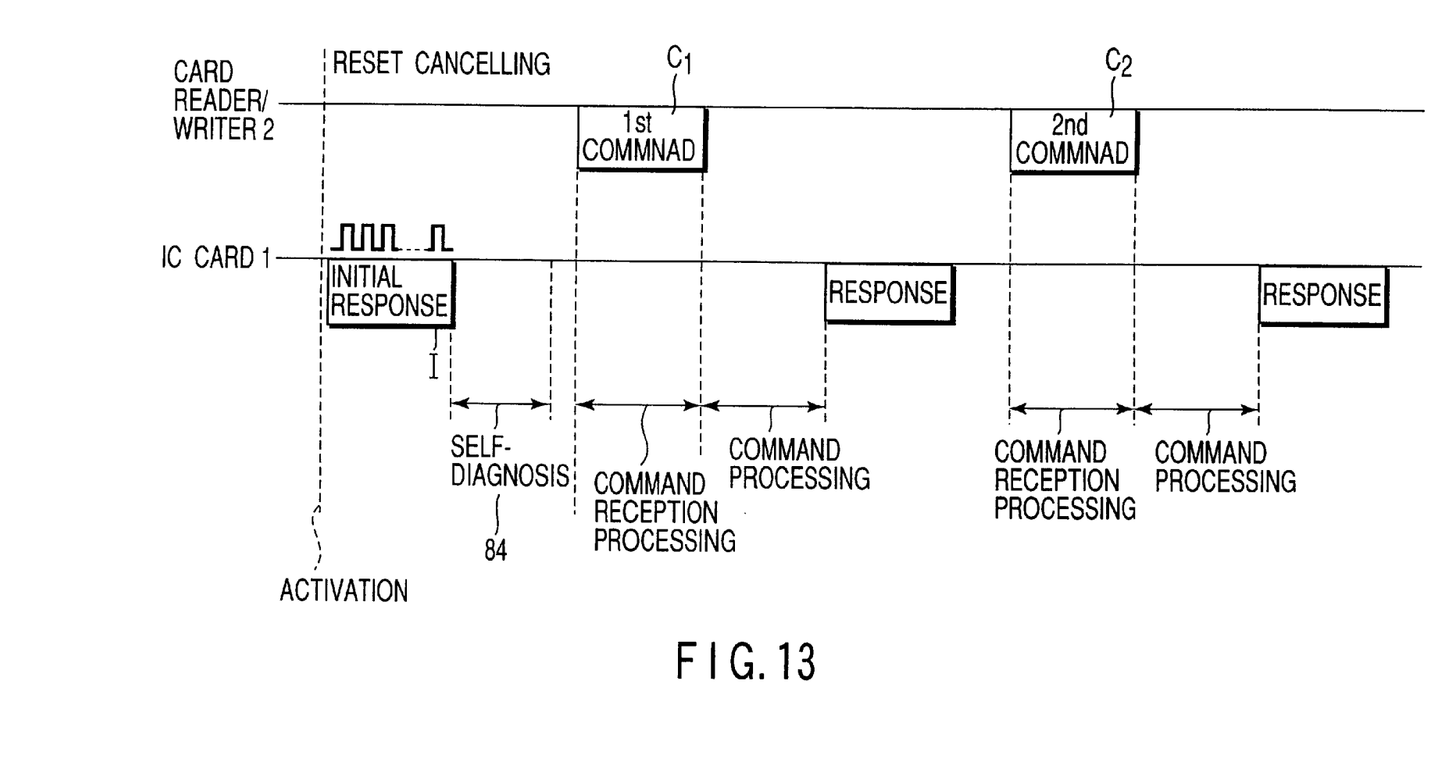
FIG. 13 is a timing diagram for use in explanation of the second operation of the IC card.

FIG. 13 is a timing diagram in the case where the initial response output is performed without self-diagnosis. In this case, self-diagnosis (84) is performed to completion after the initial response output I because no command is received. After the self-diagnosis, a command is received and command processing is performed. The two operations will not interfere with each other.

As described above, in the present invention the self-diagnosis 81 after the initial response output I, it is possible to receive certainly the command at anytime after the initial response data I has been output.

According to the present invention, as described above, a portable electronic device can be provided which permits a self-diagnosis to be performed with certainty even if a command is received at any time after initial response data I has been output and hence permits malfunctions to be prevented with certainty.

In addition, according to the present invention, the self-diagnosis can be performed during an idle time (command waiting time) within processing time, thus providing a portable electronic device which permits the total processing time from the beginning to the end of session to be utilized in an efficient manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable data processing device comprising:

first self-diagnosis means for, after the portable data processing device is connected to and activated by an external device, performing a portion of self-diagnosis of whether the portable data processing device operates properly;

initial response transmit means for, after the portion of the self-diagnosis is terminated by the first self-diagnosis means, transmitting all initial response data to the external device;

second self-diagnosis means for performing the remaining portions of the self-diagnosis after the initial response transmit means has transmitted the initial response data to the external device; and command processing means for receiving a command from the external device and performing corresponding processing to the received command after the termination of the self-diagnosis by the second self-diagnosis means.

2. The portable data processing device according to claim 1, wherein the second self-diagnosis means includes means for, when a command is received from the external device while the self-diagnosis by the second self-diagnosis means is being performed, suspending the self-diagnosis to receive the command and then resuming the self-diagnosis.

3. The portable data processing device according to claim 1, wherein the second self-diagnosis means includes means for, when a command is received from the external device while the self-diagnosis by the second self-diagnosis means is being performed, suspending the self-diagnosis to receive the command, resuming the self-diagnosis on termination of the reception of the command, and performing corresponding processing to the received command on termination of the self-diagnosis.

4. The portable data processing device according to claim 1, wherein the second self-diagnosis means performs the self-diagnosis step by step and includes means for storing the result of each step in the self-diagnosis into a storage area.

5. The portable data processing device according to claim 1, wherein the second self-diagnosis means includes means for, when the results of the self-diagnosis indicate abnormality, outputting a status indicating an error.

6. The portable data processing device according to claim 1, further including a controller, a data memory, and a work memory, and wherein the second self-diagnosis means tests each of the controller, the data memory and the work memory to ensure whether it operate properly.

7. The portable data processing device according to claim 1, wherein the second self-diagnosis means performs the self-diagnosis step by step and further includes means for storing the result of each step in the self-diagnosis into a storage area in the form of a pointer indicating one of "unexecuted", "in execution", "normally terminated", and "abnormally terminated".

8. A portable data processing device comprising:

first self-diagnosis means for, after the portable data processing device is connected to and activated by an external device, performing a portion of self-diagnosis of whether the data processing device operates properly;

initial response transmit means for, after the portion of the self-diagnosis is terminated by the first self-diagnosis means, transmitting all initial response data to the external device;

second self-diagnosis means for making the remaining portions of the self-diagnosis after the initial response transmit means has transmitted the initial response data to the external device and, when a command is received from the external device while the self-diagnosis is being performed, suspending the self-diagnosis to receive the command, resuming the self-diagnosis on termination of the reception of the command; and command processing means for performing corresponding processing to the received command after the termination of the self-diagnosis by the second self-diagnosis means.

* * * * *